Dec. 3, 1935.                R. E. PAINTER                2,023,093
                         DOUGHNUT FORMING MACHINE
                          Filed June 13, 1934           2 Sheets-Sheet 1
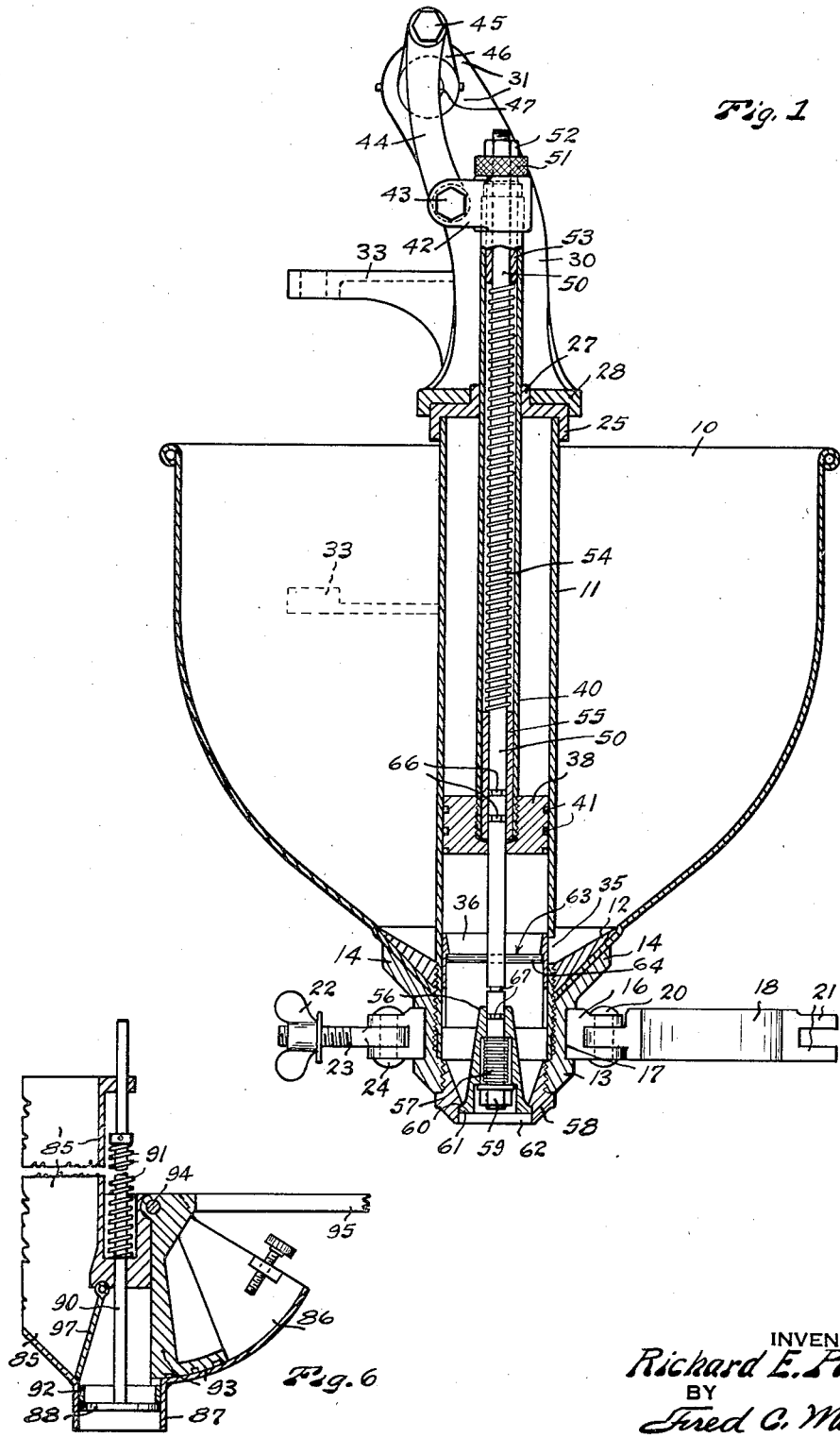
INVENTOR
Richard E. Painter
BY
Fred C. Matheny
ATTORNEY Dec. 3, 1935. R. E. PAINTER 2,023,093
DOUGHNUT FORMING MACHINE
Filed June 13, 1934  2 Sheets-Sheet 2
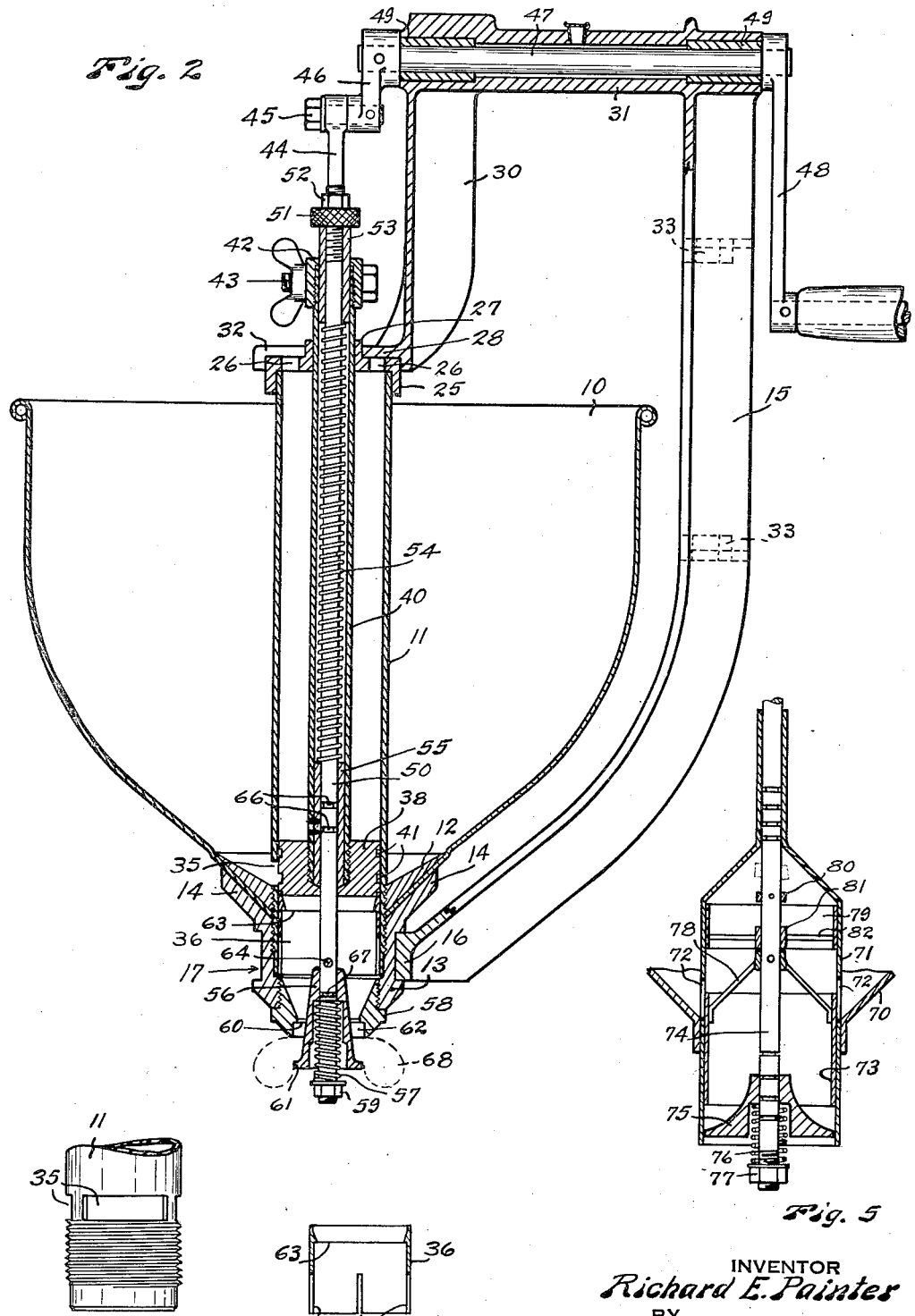
INVENTOR
Richard E. Painter
BY
Fred C. Matheny
ATTORNEY Patented Dec. 3, 1935

2,023,093

UNITED STATES PATENT OFFICE 2,023,093

DOUGHNUT FORMING MACHINE

Richard E. Painter, Seattle, Wash.

Application June 13, 1934, Serial No. 730,439

12 Claims. (Cl. 107—14)

My invention relates to doughnut forming machines of the type used for forming doughnuts from dough and the primary object of my invention is to provide a doughnut forming machine which will stretch the surface of the dough and place the same under tension at the time the doughnut is formed thus accomplishing what I term the stretching of a skin around the raw doughnut.

It is desirable in the baking of doughnuts to prevent, to as great a degree as possible, the absorption by the doughnuts of the grease in which they are cooked. In the first place the absorption of this grease by the doughnuts makes said doughnuts greasy and soggy and thus injures their quality and flavor. In the second place this grease in which the doughnuts are cooked is a substantial item in the cost of production of the doughnuts and a considerable saving in cost results where the raw doughnuts can be formed so that they absorb less grease during the process of cooking.

In accordance with my invention I provide a doughnut forming machine in which the dough is placed under sufficient pressure to open a spring loaded valve and the doughnut which is being formed is squeezed out past this spring loaded valve thereby forming a skin like covering of tightly stretched dough around the exterior of the doughnut which skin like covering renders the doughnut much more highly resistant to the absorption of the hot grease in which it is cooked than it otherwise would be. This also results in the forming of a very thin crust on the doughnuts, which crust is relatively non-porous and greatly helps in retaining the flavor and freshness of the doughnuts, whereas doughnuts as usually formed and baked have a relatively thick, grease soaked porous crust which permits loss of flavor and drying out more quickly and is generally less desirable.

Other objects are to provide a doughnut forming machine which is simple and inexpensive in construction, reliable and rapid in operation and one which will not churn the dough in the machine.

Other and more specific objects of the invention will be apparent from the following description taken in connection with the accompanying drawings.

In the drawings Figure 1 is a vertical sectional view of a doughnut forming machine constructed in accordance with my invention, showing the valve in a closed position and the piston retracted.

Fig. 2 is a vertical sectional view of the same taken in a plane at right angles to the plane of section of Fig. 1, showing the discharge valve open and the piston in the lowermost position.

Fig. 3 is a detached fragmentary view in elevation of the lower end of a suction tube embodied in the invention showing the dough inlet openings therein.

Fig. 4 is a detached sectional view of a tubular slide valve used in said suction tube.

Fig. 5 is a sectional view, with parts broken away, showing a modified type of doughnut forming means.

Fig. 6 is a sectional view with parts broken away showing another modified type of doughnut forming means.

Like reference numerals designate like parts throughout the several views.

Referring to the drawings, I show a doughnut forming machine embodying a hopper shaped bowl or receptacle 10 which is open at the top and has a centrally positioned opening at the bottom. 11 is a suction tube which is positioned axially within the bowl 10 and extends downwardly through the opening in the bottom end of said bowl. A conical nut 12 and a bowl supporting sleeve 13 having a conical upper end flange 14 are screw threaded onto the lower end portion of the suction tube 11 and the lower end of the bowl 10 is rigidly and securely clamped between the conical nut 12 and the flange 14. The bowl 10, suction tube 11, nut 12 and sleeve 13 thus are all rigidly secured together with the tube 11 extending upwardly in the bowl coaxially thereof and terminating approximately at the level of the top of the bowl. This bowl assembly is preferably supported in a frame or bracket embodying an upright frame member 15 curved to correspond to the curvature of the bowl and having at the bottom a semi-circular collar portion 16 adapted to fit within an annular recess 17 in the bowl supporting sleeve 13. A semi-circular clamp member 18, shown in an opened up position in Fig. 1, cooperates with the collar portion 16 of the frame to secure the bottom portion of the bowl assembly to the frame in such a manner that it may be quickly and easily released. One end of the clamp member 18 is secured by pivot means 20 to the collar portion 15 and the other end of the clamp member 18 is forked as at 21 and adapted to be engaged by a wing nut 22 on an eye bolt 23 which is secured by a pivot means 24 to the other side of the collar portion 15.

A cap 25 is provided on the top end of the suction tube 11. This cap 25 has perforations 26 and also has an upwardly projecting central tubular boss 27. The cap 25 is adapted to fit within a circular recess in a pad portion 28 on a frame piece 30. The frame piece 30 is connected by an integral bearing portion 31 with the upright frame member 15. The pad portion 28 preferably has a radial slot 32 large enough to receive the tubular boss 27. This slot facilitates detachment and attachment of the bowl assembly relative to the frame. Suitable brackets 33 may be provided on the frame piece 15 for pivotally securing said frame piece to any suitable support, as to a wall.

The suction tube 11 has a plurality of dough inlet openings 35 provided in its walls. The lower edges of these dough inlet openings 35 are preferably positioned substantially flush with the upper concave surface of the cone shaped nut 12. A sleeve valve 36 is reciprocably disposed within the lower portion of the suction tube 11 and adapted to be moved vertically to open and close the dough inlet openings 35. The lower skirt portion of this sleeve valve may be slotted as shown at 37 in Fig. 4.

A piston 38 is reciprocably disposed within the suction tube 11 above the sleeve valve 36. A tubular piston rod 40 is secured to the piston 38 and extends upwardly therefrom through the boss 27 of the cap 25 on the top end of the suction tube 11. Annular grooves 41 are preferably provided in the periphery of the piston 38 into which dough may enter and help to provide an air tight fit between the piston and the inner walls of the suction tube 11.

The upper end of the tubular piston rod 40 has a fitting 42 secured thereto and this fitting 42 is pivotally connected, by a readily removable bolt 43, with the lower end of a link 44. The upper end of the link 44 is connected by a pivot bolt 45 with a crank arm 46 which is fixedly secured to one end of a shaft 47. The shaft 47 is journaled in suitable bearings 49 in the bearing tube portion 31 of the frame bracket and is fixedly connected at its outer end with a crank handle 48 by which it may be rotated. Obviously power operated driving means may be connected with the shaft 47 instead of the manually operated crank handle 48. Rotation of the shaft 47 will produce reciprocation of the tubular piston rod 40 and piston 41.

A valve operating rod 50 is extended through the tubular piston rod 40 in a lengthwise direction and is longitudinally movable with respect to said piston rod. An adjusting nut 51 and a jam nut 52 are threaded onto the top end of the valve operating rod 50 and are adapted to be engaged by the fitting 42 when said fitting 42 is at the upper limit of its movement as shown in Fig. 1. By adjustment of the nuts 51 and 52 it is possible to vary the size of the doughnuts which are formed, as hereinafter explained. A sleeve 53 is provided on the upper end portion of the valve operating rod 50 in engagement with the nut 51 and slidably disposed within the tubular piston rod 40 and fitting 42. The lower end of this sleeve 53 is engaged by a relatively long compression spring 54. Another sleeve 55 supports the lower end of the spring 54. A valve member 56 is slidably supported on the lower end portion of the valve operating rod 50 and is urged upwardly by a compression spring 57 which is supported by a nut 59 on the rod 50. The valve 56 is relatively long and is tapered and the spring 57 is positioned within a suitable recess in said valve whereby the spring is fully protected from contact with the dough. A die member 58 is provided on the lower end of the sleeve member 13. This die member has a seat 60 for cooperation with a flange portion 61 on the valve 56 and is provided below the seat 60 with a cylindrically recessed portion 62 of just large enough diameter to receive the flange portion 61, whereby the flange portion 61 must move downwardly a substantial distance after it leaves the seat 60 before the valve will be open to the discharge of dough.

The slide valve 36, has an internal annular shoulder 63 a short distance downwardly from the top end. This shoulder 63 is adapted to be engaged by a cross arm or pin 64 which is rigid with the shaft or stem 50 to move the slide valve upwardly into closed position on the up stroke of the piston. The slide valve 36 has saw cuts or splits 37 in the skirt portion thereof extending from the bottom upwardly. These splits 37 allow the lower end of the slide valve to expand resiliently and to frictionally engage the walls of the tube. This friction together with the added friction of the dough which wedges between the slide valve 36 and the suction tube 11 prevents movement of the slide valve 36 except when it is engaged by the piston 38 or the cross arm 64.

Annular grooves are provided in the rod 50 within the sleeve 55 and other grooves 67 are provided in said rod 50 within the upper end of the valve member 56. These annular grooves may fill with dough which serves as a packing and air seal.

In making this doughnut machine ready for use the hopper 10 is filled or partially filled with dough and an edible oil, as salad oil, which will also serve as a lubricant is introduced through openings 26—32 into the suction tube above the piston 38. Very little of this salad oil can pass the piston 38 but it keeps the piston 38 and the walls of tube 11 lubricated and makes the machine operate more easily.

In describing the operation of this machine it is assumed, to begin with, that the piston 38 is at the lowest point in its stroke and that a doughnut 68 has just been squeezed out as shown in Fig. 2. This doughnut has been squeezed out by pressure exerted on the dough as the piston 38 moved downwardly. As the piston starts to move upwardly from this lowermost position it relieves the pressure on the dough in the suction tube below said piston and starts to create a suction. This causes the valve 56 to close quickly due partly to the action of the springs 54 and 57 and partly to the suction produced by the upward movement of the piston. This closing of the valve 56 cuts off the doughnut 68 which may drop into a pan of hot grease to be cooked in the usual manner.

Shortly after the piston 38 starts to move upwardly it begins to uncover and open up the intake ports 35. This opening of the ports 35 occurs before enough suction is produced in the lower end of the suction tube to interfere with the free and easy operation of the machine. As soon as the ports 35 begin to open they permit dough to be drawn into the suction tube as the piston moves on up toward the top of its stroke.

During the time dough is being drawn in and until the piston approaches near to the upward limit of its movement the slide valve 36 remains open due to gravity and to friction which is increased by the presence of dough between the exterior of sleeve valve and suction cylinder, and further due to the absence of any forces tending to close said valve. No closing force is exerted on the sleeve valve during this time because the lower spring 57 restrained by the seated valve 56 tends to hold the center shaft down. The spring 57 is stronger than the spring 54 and will hold the valve operating rod 50 down against the combined pressure of spring 54 and the friction of the upwardly moving parts. As the piston 38 approaches the upper limit of its travel and after the crank 48 passes a horizontal position in its upward movement then the fitting 42 at the top of the tube 40 engages the nut 51 and positively lifts the center rod 50. This causes lower cross pin 64 to engage the shoulder 63 of the sleeve valve 56 and move said sleeve valve upwardly over the port openings 35. These port openings 35 are not always entirely closed by the upward movement of the reciprocable parts, due to variations in adjustment of the nut 51, but when they are fully closed the final closing preferably occurs just as the piston reaches the limit of its upward movement, thereby avoiding undue resistance on the piston due to suction. If complete cut off is allowed then doughnuts of maximum size are produced. If a smaller doughnut is desired then nut 51 is adjusted so that the sleeve valve 36 will not completely cut-off the inlet of dough by not entirely closing the intake ports 35. This incomplete cut-off results in the same amount of dough being drawn in as would be if the valve 36 was moved far enough to completely close the ports but the piston subsequently ejects part of this dough on its downward movement depending on size of opening left, thus providing for reducing the size of the doughnut. By varying this opening the size of the doughnut may be varied. Also adjustment of the bottom nut 59 may be made to vary the size of the doughnut.

As the piston 38 moves downwardly it exerts a pressure on the dough and at the same time relieves the pressure on spring 57, and to a lesser extent, relieves the pressure of spring 54. During the first and major portion of the downward movement of the piston 38 the sleeve valve 36 remains closed due to frictional engagement with the walls of tube 11 and to the absence of any pressure tending to open it. The pressure exerted on the dough as the piston 38 begins to move downwardly starts to move the valve 56 downwardly and this valve 56 must move a distance equal to the depth of the tubular opening 62 in the die member 58 before the valve 56 begins to open. During this time the spring pressures are diminishing and when the valve 56 begins to open it will open speedily and will not flutter. As this valve 56 begins to open the escaping dough which is under pressure will be retarded by friction at the locations where it contacts the die 58 and the valve 56 and will squeeze out faster between these two locations and the result is that a skin like outer layer of dough is formed and expanded and filled by the dough which is being squeezed out between the valve member and the die but not in contact with either. To secure this surface tension or skin on the exterior of the doughnut it is necessary that the dough should be squeezed out in opposition to a resilient pressure as against the pressure of the springs.

Just before the piston 38 reaches its lowermost position it engages with the top of the slide valve 36 and moves said slide valve downwardly below the level of the ports 35 but these ports are not uncovered so as to relieve dough pressure in the suction tube 11 because the piston 36 fits and snugly closes the top of the sleeve valve 36 and also closes the ports 35 as it moves downwardly.

The doughnut is fully formed at the time the piston 38 reaches its lowermost position and as the piston starts to move upwardly this doughnut is cut off and dropped, as hereinbefore explained.

I also find that the size of the doughnut made by this machine may be varied by varying the length of stroke of the piston. This can be accomplished by varying the crank throw, as by varying the length of the crank 46.

Due to providing for the stretching or surface tensioning of the exterior of the doughnut I am able to use warmer and softer dough than can be used in doughnut forming machines where no such tensioned surface membrane is formed. This warmer softer doughnut takes a more even and uniform expansion when dropped into hot grease and is less liable to produce lumpy doughnuts.

It will be noted that the reciprocating parts of my machine are completely housed within the suction tube 11 and for this reason churning of the dough is almost completely avoided.

In Fig. 5 I have shown a modified form of my doughnut forming machine embodying a hopper 70 rigid with an axial suction tube 71 which extends from a point below the hopper up into the same. 72 are dough inlet openings in the walls of the suction tube 71, and 73 is a sliding sleeve within said tube 71. 74 is a valve operating rod having a conical valve 75 slidably disposed on the lower end portion thereof and urged upwardly by a compression spring 76 which abuts against a nut 77 on the lower end of the valve operating rod. 78 is a bale member which connects the sleeve 73 to the valve operating rod 74 so that these two parts will move together. 79 is a slide valve slidable in the suction tube 71 above the sleeve 73 and adapted to be moved upwardly and downwardly respectively by engagement of the bale 78 or by engagement of a collar 80 with the hub member 81 of an open spider 82 which is connected with the slide valve 79.

The valve operating rod 74 extends upwardly through a tubular stem 83 on the suction tube 71 and is connected with suitable mechanism for reciprocating said rod, which reciprocating mechanism may be the same as shown in Figs. 1 and 2.

The operation of the device shown in Fig. 5 is as follows, it being assumed that the cycle starts with all parts in their uppermost position as shown in said Fig. 5. As the rod 74 and sleeve 73 move downwardly the bottom end of the sleeve 73 will contact the top portion of the valve 75, which has lagged behind the sleeve in the succeeding upward movement of these parts. The valve 75 will thus be caused to close the bottom of the sleeve and to cooperate with said sleeve in forming a vacuum cup which will draw in dough through ports 72 as these parts move on down. This intake of dough continues until the sleeve valve 79 is completely closed by the action of collar 80. This complete closing or cut off occurs at substantially the bottom of the stroke and at this time the entire cavity above the valve 75 will be full of dough and the bottom end of the sleeve 73 will be a substantial distance below the lower end of the suction tube 71. When the rod 74 and sleeve 73 start to move upwardly the pressure of the dough which is trapped in the cavity above the valve 75 will start to unseat said valve and dough will be forced out between the valve 75 and the bottom end of the sleeve 73 thus forming a doughnut. At the same time the sleeve 73 and valve 75 will continue to move upwardly and by the time the doughnut is fully formed the valve 75 will be close to the bottom of the suction tube 71 and the doughnut will be cut off and dropped just as said valve 75 enters the suction tube 71. Also the bale 78 will engage the hub 81 and begin to open the slide valve 79 just as the valve 75 enters the bottom end of the tube 71.

By operating in the manner above described, this apparatus shown in Fig. 5, forms a doughnut by squeezing the dough out in opposition to the pressure of the spring 76 and thus forms the skin like membrane around the doughnut, as described in connection with the preceding figures.

In Fig. 6 I have shown still another modified form of my invention in which 85 designates a hopper, 86 a compartment at the side of said hopper, 87 an outlet tube common to the hopper and the compartment and 88 a valve operable in outlet tube 87 and secured to a stem 90 having a spring 91 thereon. The spring 91 urges the valve 89 upwardly against a stop 92 and must be compressed before dough can be ejected to form a doughnut. 93 is an oscillating piston which fits within the compartment 86 and is pivoted at 94. A handle 95 is provided for operating the piston 93 and an adjustable stop screw 96 is provided in the path of movement of the piston 93 for limiting the stroke of the piston and predetermining the size of the doughnuts. A check valve 97 is provided between the hopper 85 and the compartment 86. This check valve is arranged so that it will permit dough to be drawn from hopper 85 into compartment 86 but will prevent return of this dough into the hopper when said dough is placed under pressure. In the operation of the device shown in Fig. 6, when the handle 95 is moved upwardly the piston 93 will be moved away from the hopper thus creating a suction which will draw dough past check valve 97 into the space between the piston and check valve 97. When the piston is moved back toward check valve 97 this check valve will close and the dough will force the piston 88 down and will be squeezed out around said piston in the form of a doughnut with a tight surface membrane on the exterior. As soon as pressure is released by several of the directions of movement of the piston 93 the spring 91 will move the valve 88 into a closed position and cut off the doughnut.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a doughnut forming machine of the class described; a dough chamber having a discharge opening; a pressure opened valve positioned to close said discharge opening and opened by pressure within the dough chamber; resilient means urging said valve into closed position, said resilient means yielding as dough pressure opens said valve and pressure exerting means in said dough chamber whereby the dough may be placed under pressure and forced out past said valve.

2. In a doughnut forming machine; a dough hopper; a dough chamber communicatively connected with said dough hopper and having an outlet opening; valve means controlling communication between said dough hopper and said dough chamber; a pressure opened outlet valve positioned to close said outlet opening; yielding means urging said outlet valve into closed position, said yielding means yielding as dough pressure opens said valve and piston means operatively connected with said dough chamber whereby dough may be drawn into said dough chamber and expelled through said outlet opening.

3. In a doughnut forming machine; a dough hopper; a dough chamber communicatively connected with said dough hopper and having an outlet opening; inlet valve means controlling communication between said dough hopper and said dough chamber; a pressure opened outlet valve positioned to close said outlet opening; yielding means urging said outlet valve into closed position, said yielding means yielding as dough pressure opens said valve and suction and pressure producing means operatively connected with said dough chamber whereby dough may be drawn into said dough chamber and expelled through said outlet opening past said yieldingly supported valve to form a doughnut having an external skin like membrane.

4. In a doughnut forming machine; a dough hopper; a suction tube disposed within said hopper, said tube having dough intake openings positioned within the hopper adjacent to the bottom thereof and having a discharge opening external to said hopper; valve means positioned to selectively open and close said dough intake openings; a piston reciprocable within said suction tube; a pressure opened outlet valve closing said discharge opening from the exterior; and yielding means urging said outlet valve into closed position and yielding to dough pressure moving said valve to open position.

5. In a doughnut forming machine; a dough hopper; a suction tube disposed axially of said hopper, said tube having dough intake openings positioned within the hopper adjacent to the bottom thereof and having a discharge opening positioned below the bottom of the hopper; valve means in the tube movable to open and close said dough intake openings; a piston reciprocable within said suction tube; a pressure opened outlet valve closing said discharge opening from the exterior; and spring means urging said outlet valve into closed position and yielding to dough pressure moving said valve to open position.

6. In a doughnut forming machine; a dough hopper; a suction tube having a portion positioned within the hopper and having dough intake openings communicating with the hopper near the bottom of said hopper; discharge means connected with said suction tube and having an outlet opening positioned below said hopper; a pressure opened outlet valve closing said discharge opening and moved to dough discharging position by pressure within the suction tube; spring means yieldingly urging said outlet valve against the dough during the discharge of the same; a tubular sleeve valve movable within said suction tube into open and closed positions relative to said dough intake openings; and a piston reciprocable within said suction tube.

7. In a doughnut forming machine; a dough hopper; a suction tube having a portion positioned within the hopper and having dough intake openings communicating with the hopper near the bottom of said hopper; discharge means connected with said suction tube and having an outlet opening affording a fixed valve seat positioned below said hopper; a pressure opened outlet valve closing said discharge opening and opened by dough pressure within the suction tube; spring means yieldingly urging said outlet valve closed and yielding to said dough pressure as said valve is opened; a tubular sleeve valve movable within said suction tube into open and closed positions relative to said dough intake openings; a piston reciprocable in said suction tube; and means connected with said piston for moving said sleeve valve.

8. In a doughnut forming machine; a dough hopper; a suction tube having a portion positioned within the hopper and having dough intake openings communicating with the hopper near the bottom of said hopper; discharge means connected with said suction tube and having an outlet opening positioned below said hopper; a piston reciprocably disposed within said suction tube; reciprocable driving means connected with said piston; a valve operating rod; a spring urging said valve operating rod upwardly; adjustable stop means on the upper end of said valve operating rod; an outlet valve slidably mounted on the lower end portion of said valve operating rod; another spring urging said outlet valve upwardly on said valve operating rod, said outlet valve being adapted to be drawn upwardly into closed position relative to said outlet opening; and a tubular sleeve valve movable within said suction tube into open and closed position relative to said dough intake openings.

9. In a doughnut-forming machine; a dough hopper; a suction tube having a portion positioned within the hopper and having dough intake openings communicating with the hopper near the bottom of said hopper; discharge means connected with said suction tube and having an outlet opening positioned below said hopper; a piston reciprocably disposed within said suction tube; a tubular piston rod connected with said piston; reciprocable driving means connected with the tubular piston rod; a valve operating rod slidable within said tubular piston rod; a spring urging said valve operating rod upwardly; adjustable stop means on the upper end of said valve operating rod; an outlet valve slidably movable on the lower end portion of said valve operating rod; another spring urging said outlet valve upwardly on said valve operating rod, said outlet valve being adapted to be drawn upwardly into closed position relative to said outlet opening; and a tubular sleeve valve movable within said suction tube into open and closed position relative to said dough intake openings.

10. In a doughnut forming machine; a dough hopper; a suction tube having a portion positioned within the hopper and having dough intake openings communicating with the hopper near the bottom of said hopper; discharge means connected with said suction tube and having an outlet opening positioned below said hopper; a piston reciprocably disposed within said suction tube; a tubular piston rod connected with said piston; reciprocable driving means connected with the tubular piston rod; a valve operating rod slidable within said tubular piston rod; a spring urging said valve operating rod upwardly; adjustable stop means on the upper end of said valve operating rod; an outlet valve slidably movable on the lower end portion of said valve operating rod; another spring urging said outlet valve upwardly on said valve operating rod; said outlet valve being adapted to be drawn upwardly into closed position relative to said outlet opening; a tubular sleeve valve within said suction tube movable into open position relative to said dough intake openings by engagement with said piston and means carried by said valve operating rod for engaging said sleeve valve and moving said sleeve valve into closed position relative to said dough intake openings.

11. In a doughnut forming machine, a suction chamber; dough supply means connected with said suction chamber; a suction operated swingingly mounted check valve between said dough supply means and said suction chamber; means forming a dough outlet from said suction chamber, said dough outlet having a discharge opening; a spring loaded valve yieldingly held in closed relation as respects said discharge opening; and piston means operatively connected with said suction chamber, whereby suction and pressure may be produced alternately in said suction chamber to draw in dough past said check valve and expel said dough from the discharge opening of said dough outlet.

12. In a doughnut forming machine; a suction tube; dough supply means connected by ports with said suction tube; a sleeve valve in said suction tube slidable into open and closed positions with respect to said ports; an operating rod reciprocably movable in said tube; a tubular sleeve member secured to said operating rod and slidable within said suction tube below said ports; a valve member movably supported on the lower end portion of said operating rod; a spring urging said valve member upwardly, said valve member being arranged to enter the lower end of said suction tube and engage with the lower end of said tubular sleeve member whereby a suction exerting element is formed jointly by said tubular sleeve member and said piston member.

RICHARD E. PAINTER.